July 14, 1953     P. M. GREEN     2,645,767
ELECTROMECHANICAL INTERVAL TIMER

Filed Jan. 26, 1951     3 Sheets-Sheet 1

PHILLIP M. GREEN
INVENTOR.

BY D. Carl Richards
AGENT

July 14, 1953  P. M. GREEN  2,645,767
ELECTROMECHANICAL INTERVAL TIMER
Filed Jan. 26, 1951  3 Sheets-Sheet 2

PHILLIP M. GREEN
INVENTOR.

BY D. Carl Richards
AGENT

July 14, 1953 P. M. GREEN 2,645,767
ELECTROMECHANICAL INTERVAL TIMER
Filed Jan. 26, 1951 3 Sheets-Sheet 3

PHILLIP M. GREEN
INVENTOR.

BY D. Carl Richards
AGENT

Patented July 14, 1953

2,645,767

UNITED STATES PATENT OFFICE 2,645,767

ELECTROMECHANICAL INTERVAL TIMER

Phillip M. Green, Dallas, Tex., assignor, by mesne assignments, to Socony-Vacuum Oil Company, Incorporated, New York, N. Y., a corporation of New York Application January 26, 1951, Serial No. 207,995

5 Claims. (Cl. 340—359)

This invention relates to time interval measurements and more particularly to the production of electrical impulses spaced a predetermined selected time interval apart.

A device that supplies a start and a stop voltage pulse with a known time between the pulses, termed an interval timer, has many applications in the field of counting mechanisms. For example, the number of impulses per second from a Geiger tube detecting radio active radiation or the frequency of an oscillator may be determined as by a counter under the control of an interval timer producing an accurate timing interval of known duration.

By the present invention there is provided a system for producing two control pulses spaced apart in time by an interval controlled by a stable frequency standard, the interval being adjustable in steps of a multiple of the period of the standard. The system is a frequency count down arrangement that may be operated intermittently at selected times for counting or for control purposes in general.

In accordance with the present invention there is included a source of constant frequency square wave pulses in a timing system having a mechanically advancing relay characterized by an input circuit, a plurality of output positions, and electromagnetic reset means for the advancing mechanism. A circuit connecting the source to the input circuit applies the square wave pulses to the relay having an output circuit including selected pair of the output positions. Circuit means is provided for applying the square wave pulses from the source to the electromagnetic reset means to actuate the relay sequentially to connect the input circuit to each of the output positions for transmission of two of the square wave pulses to the output circuit spaced a time interval dependent upon the number of positions between the pair of output positions and the period of the square wave pulses.

For a further understanding of the present invention, reference may now be had to the following description taken in conjunction with the accompanying drawings in which.

Figure 1:
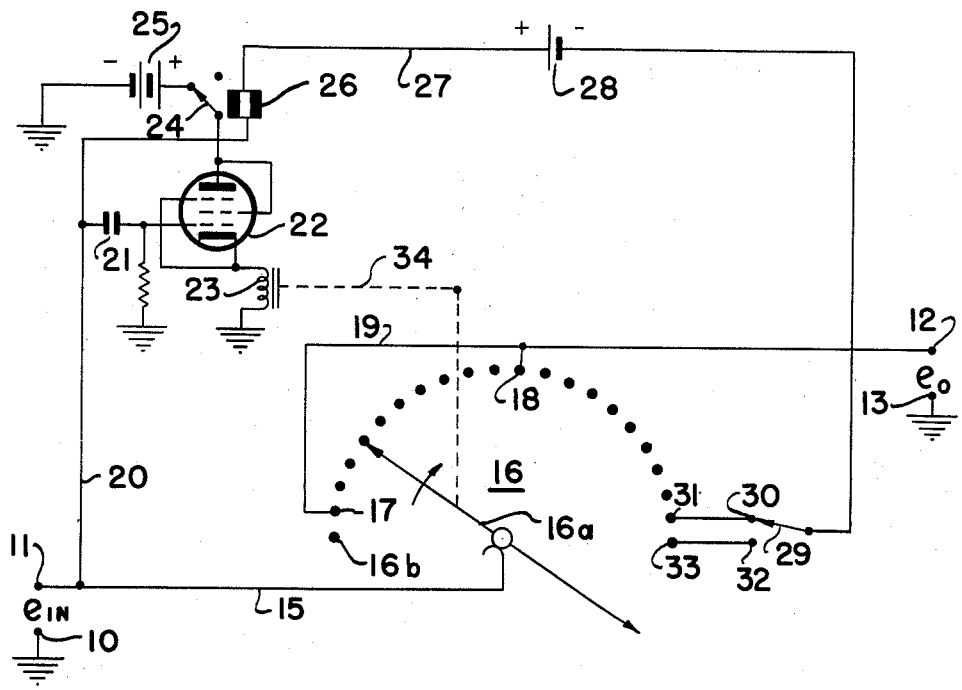
Fig. 1 is a schematic diagram of the pulse selecting system.

Referring now to Fig. 1 there is illustrated a system wherein periodically repeated voltage pulses are applied to input terminals 10 and 11, the voltage being designated as $e_{in}$. The switching circuit modifies the voltage $e_{in}$ to produce a particular character of output voltage $e_o$ appearing between output terminals 12 and 13. For the purposes of the description of Fig. 1, it will be assumed that voltage $e_{in}$ consists of constant frequency square wave voltage pulses such as illustrated in Fig. 2.

The input terminal 11 is connected by way of a conductor 15 through a friction contact to the input of a stepping switch 15 which includes switch arm 16a and has associated therewith a plurality of output terminals. Two output terminals, the terminals 17 and 18, are interconnected in the switch output circuit by conductor 19 which leads to the output terminal 12. Additionally, the input terminal 11 is connected by way of conductor 20 and condenser 21 to the input or control grid of tube 22. The cathode of tube 22 is connected to ground by way of a relay coil 23 and the anode thereof is connected through a relay 24 and plate battery 25 to ground. Additionally, the actuating coil 26 for the plate relay 24 is connected at one terminal to conductor 20 and has the other terminal connected by way of conductor 27 through battery 28 to the armature of a single pole double-throw switch 29. Contact 30 of switch 29 is connected to the output position 31 of the stepping switch 16 and in similar manner the contact 32 is connected to the output position 33. The relay 23 is electromechanically coupled as indicated by the dotted line 34 to the input circuit or switch arm 16a of the stepping switch.

Figure 2:
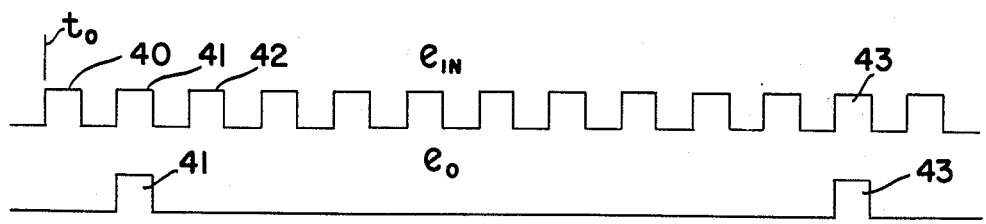
Fig. 2 is a graph of voltage pulses as they appear in the system of Fig. 1.

In operation, voltage pulses $e_{in}$ of Fig. 2 are applied both to the switch arm 16a and to the tube 22. When the positive voltage is applied to the grid of tube 22, plate current flows from battery 25, the normally closed switch 24, tube 22 and the relay coil 23 to ground. The energization of the relay coil 23 resets a mechanical stepping means that will be described in connection with Fig. 3 to permit, upon termination of current flow in the relay coil 23, the movement of the arm 16a from one output position to the next succeeding output position. Thus, for a repeated application pulses forming the voltage $e_{in}$, switch arm 16a moves sequentially in a clockwise direction from one output position to another until the output position 31 is reached. At this point, the series circuit including the plate relay coil 26 and the battery 28 is closed from output position 31 to the switch arm 16a so that the normally closed relay 24 is opened and held open, preventing further flow of anode current in tube 22. When the switch 29 is closed through the contact 32, relay 24 is again closed allowing a next succeeding pulse to energize the tube 22 which thereupon moves the switch arm 16a to the terminal 33 where again relay 24 is opened. In this position the switch arm 16a is in contact with output positions 16b and 33. From this initial position the stepping switch 16 may be operated through a second complete cycle such as above described by merely returning the switch 29 to the contact 30.

There is produced at output terminals 12 and 13 voltage pulses of the same character as the voltage pulses $e_{in}$ but occurring at a sub-frequency of the voltage $e_{in}$. More particularly, assuming that at the time, $t_o$ (Fig. 2), the switch arm 16a is in contact with output position 16b and that at this instant the switch 29 is moved to contact 30, the first pulse 40 moves the arm 16a to contact 17 whereupon the pulse 41 passes to output terminal 12 by way of conductor 19. Pulse 42 moves the switch arm 16a to the following output position. A second pulse is not transmitted to the output terminal 12 until switch arm 16a reaches the output position 18 whereupon pulse 43 is transmitted through the stepping switch. Thus, the pulses 41 and 43 may be utilized for the energization or operation of counting mechanisms which require an accurately measured timing interval.

Figure 3:
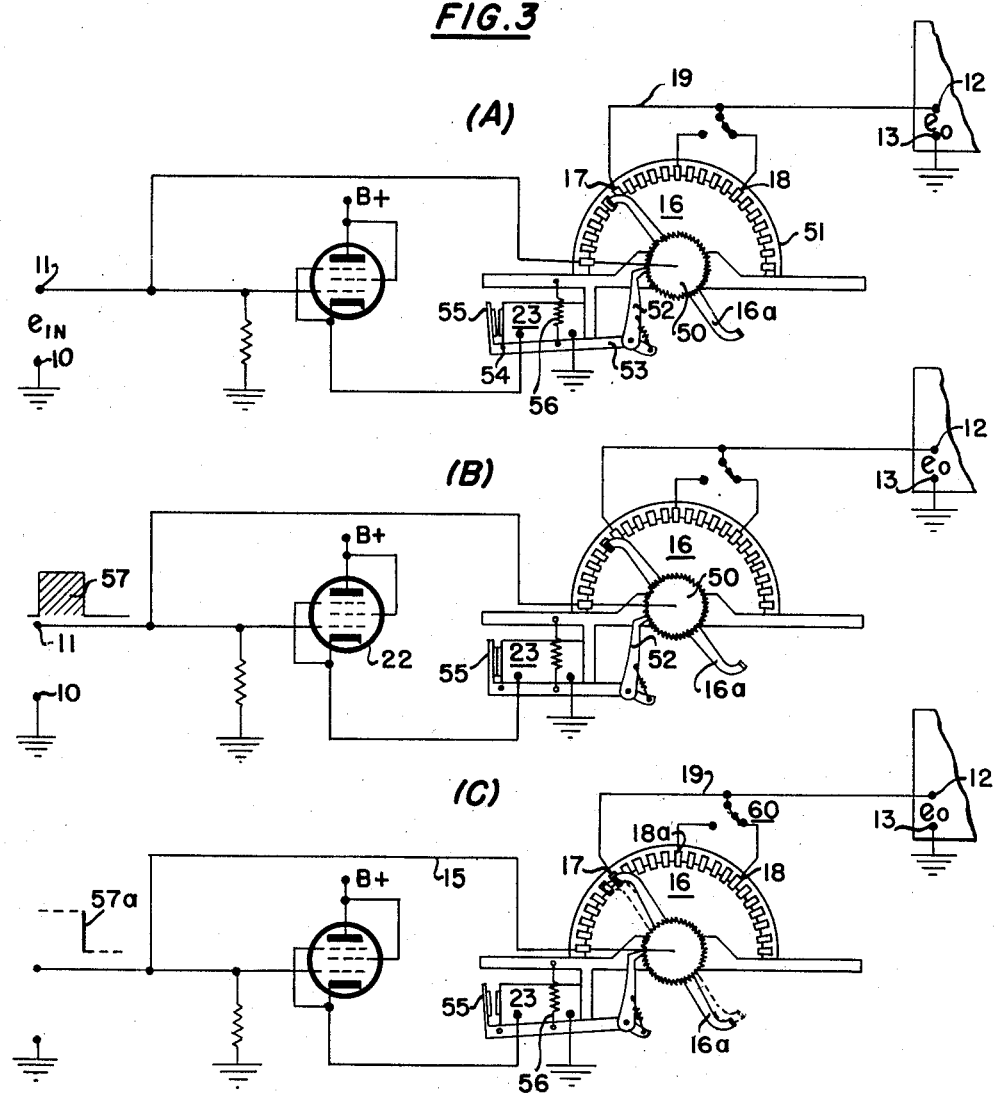
Fig. 3 is a detailed illustration of the operation of the stepping switch of Fig. 1.

Figs. 1 and 2 illustrate the operation of the present invention. The more detailed Fig. 3 illustrates the operation of the stepping switch 16. Referring to Fig. 3 (A) where like parts have been given the same reference characters as in Fig. 1, the stepping switch 16, of the type ordinarily utilized in telephone dialing systems, is provided with a geared wheel 50, mechanically coupled to the switch arm 16a and has teeth in number equal to twice the number of output positions on the semi-circular structure 51. Detent means (not shown) are provided for maintaining the switch arm 16a in a given circuit completing position while the associated mechanisms are operated. The switch arm 16a is moved from one position to another by a pawl 52 carried on the end of a lever arm 53 which is pivoted at 54. The lever arm 53 has an armature extension 55 normal thereto at the end opposite the pawl 52. The armature extension 55 is positioned adjacent the end of the core of relay coil 23.

Upon energization of relay coil 23, armature 55 is attracted toward relay coil 23, moving the pawl 52 downward into engagement with the next tooth on the wheel 50. Upon de-energization of the coil 23, a tension spring 56 coupled between the lever arm 53 and the frame of the stepping switch 16 mechanically moves the arm 16a to a next succeeding position.

Fig. 3 (A) illustrates the position of the elements of the switch 16 in the interval between pulses. In Fig. 3 (B), upon application of a pulse 57 to the input terminals 10 and 11, plate current flows through the tube 22 and relay coil 23 attracting the armature 55 to move the pawl 52 into engagement with the next tooth on the wheel 50. Coincident in time with the trailing edge 57a of the pulse applied to the tube 22, the armature 55 is released permitting the spring 56 to actuate the pawl and move the switch arm 16a to the next succeeding position such as illustrated in Fig. 3 (C). In this position the pulse following pulse 57 will flow by way of conductor 15, switch arm 16a, output position 17 and conductor 19 to the output terminal 12. Thereafter, if pulses are applied at the rate of, for example, 10 per second, a one second interval will elapse before a next pulse is applied from the output position 18 to the output terminal 12. In this system there is included a manually adjustable means for selecting the interval between pulses. Switch 60 may be connected to the output position 18, to an intermediate position 18a, or to any selected intermediate position when associated with switching means generically illustrated by switch 60. For the system illustrated in Fig. 3, pulses one second or one-half second apart may be transmitted to output terminal 12. Obviously, other pulse intervals may be obtained by suitably selecting the output positions.

Thus, in the system illustrated by Figs. 1–3, selected pulses from a train of constant frequency voltage pulses are transmitted from input terminals to output terminals to provide an accurately measured timing interval between the output pulses. The accuracy of the timing interval depends entirely upon the accuracy of the constant frequency voltage source associated therewith and is in no way limited by the operation of the pulse frequency reducing system of Fig. 1. The pulses transmitted to the output terminals 12 and 13 may be differentiated and the voltage pip thereupon produced coincident with the leading edge of the input pulse may be utilized for control of system connected to output terminal 12. The mechanical switch arrangement of the present invention provides circuits that are dormant during transmission therethrough of the leading edge of the voltage pulse used for the control purposes. The switch is operated or moved mechanically coincident with the trailing edge or the non-essential portion of the transmitted pulse. Thus, there is avoided introduction of error into the system by operation of a mechanical element, while retaining the advantage of positive circuit making and breaking of such system.

This system may be used to advantage in any of a number of pulses measuring applications or interval timing systems. A particular advantage is found in a well logging procedure such as illustrated and described in application to Julian R. Buck, a co-worker of applicant, for Frequency Sensitive System for Measuring the Rate of Fluid Flow in a Well Bore, Serial No. 207,866, filed January 26, 1951.

Figure 4:
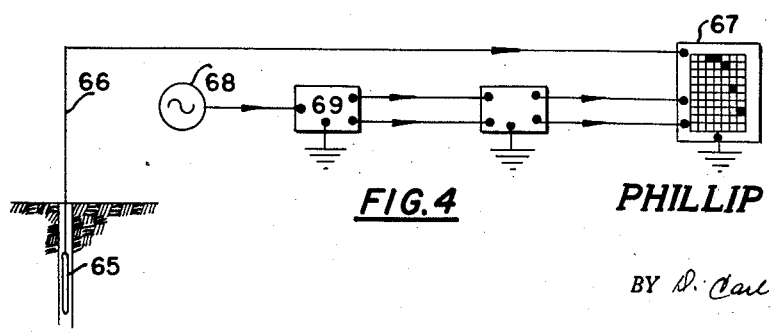
Fig. 4 illustrates in block diagram form a particular application of this system.

Generically the latter system is illustrated in Fig. 4. A well exploring instrument 65 is placed at a selected depth in a bore hole. An alternating current output signal is transmitted to the surface over cable 66, the frequency of which is dependent upon a condition in the bore hole, namely, upon the temperature of the fluids in the bore hole adjacent the instrument 65. In order to measure variations in this temperature the frequency of the signal is counted for selected intervals. A counting device 67 of a type available on the market is utilized to receive the output of the instrument 65. The counter 67 is actuated for a selected interval during which time the alternating current signal from the well exploring instrument 65 energizes a series of binary counters included in the unit 67. At the end of the selected interval or period, a series of cells or lights remain energized, being represented in Fig. 4 by the darkened sections.

Each section or cell of the counter represents a digit, and as illustrated in Fig. 4, the darkened sections correspond to the number 99,852. Through operation of the counter system this number corresponds to the number of pulses in the signal from unit 65 per selected interval of time.

Applicant's system derives from a source 68 of constant frequency voltage, pulses spaced at a selected and conveniently variable sub-multiple thereof for actuating the counter 67. In one system constructed in accordance with the present invention, the source 68 was a Low Frequency Secondary Standard, Type 2001–1L manufactured by the American Time Products, Inc., New York, N. Y. This source delivered 100 cycles per second square wave output with a precision of plus or minus ten parts per million, and a temperature coefficient of one part per million per degree centigrade in the operating range. The 100 cycle voltage pulses were applied to the frequency reducing phanastron circuit 69 illustrated in Fig. 5 which produced across the cathode follower output impedance 70, ten voltage pulses per second. The frequency reducing phanastron is of the type illustrated in the MIT Series, volume 19, entitled "Wave Forms" at page 203, Figure 5.53. The cathode follower stage 69a couples the source 68 to the phanastron 69. The output voltage appearing across impedance 70 is applied to the input terminal 11a of the stepping switch system of Fig. 6. In this form, the pulse is differentiated by condenser 71 and resistor 72 for producing pips or voltage spikes coincident with the leading and trailing edges of the square wave. The negative pips are by-passed to ground through the rectifier 73 so that positive voltage pips only are applied to the input terminal 11b coincident with the leading edge of the square wave pulse applied to terminal 11a.

Figure 5:
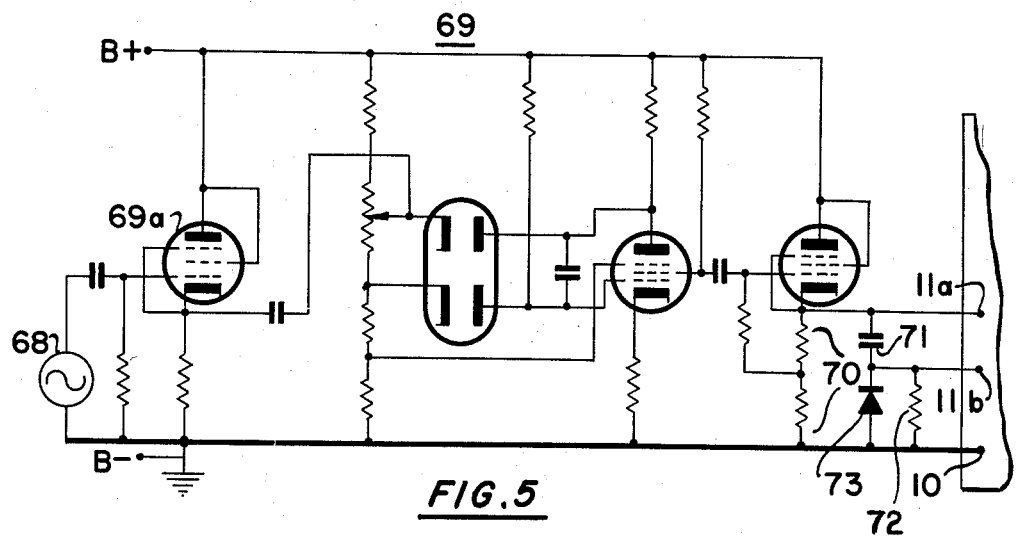
Fig. 5 is a schematic diagram of a portion of the system of Fig. 4.
Figure 6:
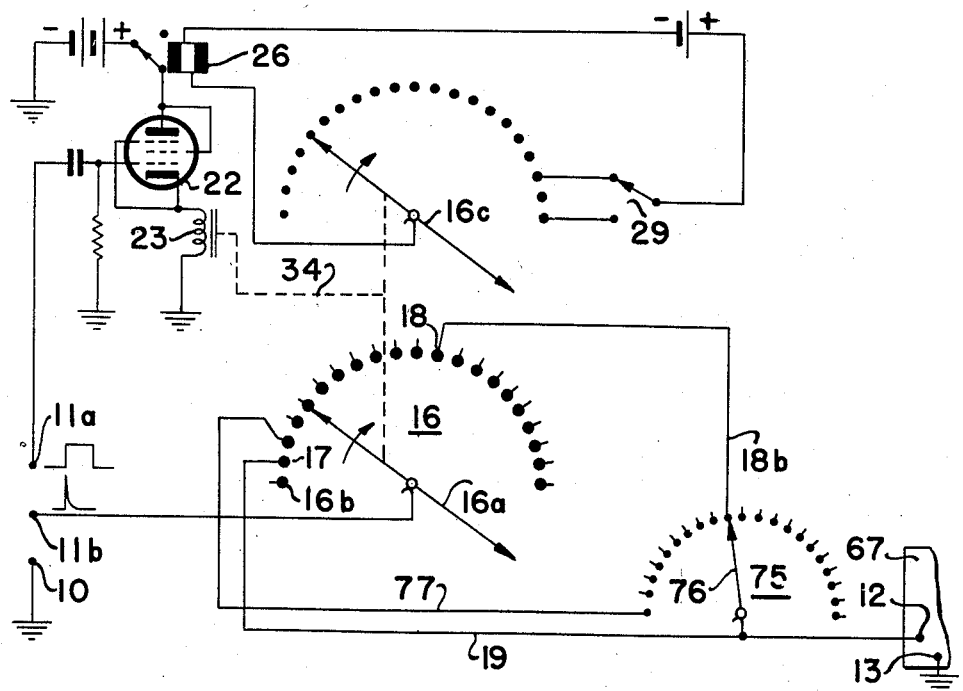
Fig. 6 is a modification of the system of Fig. 1 as used in Fig. 4.

The phanastron circuit of Fig. 5 may be coupled directly into the mechanical frequency reducing system of Fig. 6. In this system the stepping relay 16 is illustrated as having two relay arms, 16a and 16c, which respectively cooperate with two sets of output terminals. The system of Fig. 6 is provided with additional components to permit more flexible operation in the selection of the desired pulse intervals. The square wave voltage pulses are applied to the input grid of the tube 22 for control and actuation of the relay coil 23 electromechanically coupled by the coupling 34 to the switch arms 16a and 16c. Plate relay coil 26 is controlled exclusively by the circuit including the switch arm 16c, with selected connections between the switch 29, output positions or terminals associated with switch arm 16c. By operation of this circuit the reset means for the relay drive is de-energized when the circuit including switch 29 is closed.

The voltage pips coinciding with the lead edge of the square wave voltage pulses are applied exclusively to the switch arm 16a for transmission to the output terminals 12 and 13. However, there is interposed a manually adjustable pulse selector which is connected in circuit with the stepping switch 16. More particularly, the pulse selector 75 is a single pole multi-terminal switch in which the switch arm 76 is connected in circuit with conductor 19 and the initial output position 17 of the stepping relay 16. Other switch output positions are connected to switch 75 as by conductors, one of which, the conductor 77, is shown, to each of the terminals or contacts of switch 16. The output position 18 is connected by way of conductor 18b to a contact on switch 75 that corresponds with the position on the stepping switch of the output position 18. Thus, any interval in increments of one tenth of a second may be selected for actuation of the counter device 67. The interval has a minimum of one tenth of a second and a maximum limited only by the number of switch positions associated with the switch arm 16a.

The square wave voltage pulse applied to terminal 11a resets the mechanical drive means for the switch 16 at the instant the voltage pip applied to terminal 11b passes through the switch and to output terminal 12. Upon release of the armature of the relay 23 the mechanical means then drives the switch arm 16a to a next succeeding position where it awaits transmission of a voltage pip. In all cases the transmission of the control pips is by way of a circuit that is dormant during the existence of the pip and circuit changes are made in intervals that are not critical with respect to the control of the output or utilization device represented by the counter 67.

It will be apparent that the foregoing is but one form in which the invention may be utilized. Counting intervals of much greater length may be obtained merely by adding stepping switches in the series for their continued operation. The transmitted pulses may be modified, shaped or otherwise operated upon for control of particular circuits requiring peculiar wave shapes. While the invention has been described in detail, it will be apparent that modifications may be made within the scope of the appended claims.

What is claimed is:

1. In a measuring system for well logging of the type in which a voltage having a condition controlled frequency is applied to the signal circuit of a counter which has a control circuit, the combination therewith which comprises a constant frequency source of rectangular current pulses, means for deriving a voltage pip from the leading edge of each of said pulses, a stepping switch connected at its input circuit to said constant frequency source, mechanical driving means for connecting the input circuit of said stepping switch sequentially to an initial output position and to each of a plurality of succeeding output positions, electromechanical means in circuit with said constant frequency source for resetting said driving means coincident with the leading edge of said pulses, a circuit interconnecting said initial output position and a selected one of said succeeding output positions and said control circuit for transmission thereto of two pips spaced a time interval dependent upon the number of output positions between said initial output position and said selected succeeding output position and the time interval between succeeding current pulses.

2. In a measuring system for well logging of the type in which a voltage having a condition controlled frequency is applied to the signal circuit of a counter which has an electronic control circuit, the combination therewith which comprises a constant frequency source of rectangular current pulses, means for producing voltage pips corresponding with the leading edge of each of said pulses, a stepping switch connected at its input circuit to said pip producing means, mechanical driving means for connecting the input circuit of said stepping switch sequentially to an initial output position and to each of a plurality of succeeding output positions, electromechanical means in circuit with said constant frequency source for resetting said driving means simultaneously with application of said constant frequency pulses to said input circuit, manually adjustable means for connecting said initial output position and a selected one of said succeeding output positions to said control signal circuit for transmission thereto of two voltage pips spaced a time interval dependent upon the number of output positions between said initial output position and said selected succeeding output position and the time interval between succeeding current pulses.

3. In a timing system having a mechanically advancing relay characterized by a signal channel including an input circuit, a plurality of output positions, and electromagnetic reset means for the advancing mechanism, the combination therewith which comprises a source of constant frequency square wave pulses connected to said signal channel, a differentiating network means in said signal channel for producing a control pulse coincident with the leading and trailing edge of each square wave pulse, rectifier means in said differentiating network to present negligible impedance to control pulses derived from said trailing edge, a relay output circuit including a selected pair of said output positions, and means for applying said square wave pulses to said electromagnetic reset means for actuation of said relay at the trailing edge of each square wave pulse sequentially to connect said input circuit to each of said output positions for transmission of two control pulses through said signal channel spaced a time interval dependent upon the number of said output positions between said pair and the period of said square wave pulses.

4. In a timing system having a mechanically advancing relay characterized by an input circuit, a plurality of output positions, and electromagnetic reset means for the advancing mechanism, the combination therewith which comprises a source of constant frequency square wave pulses, a differentiating circuit for deriving a control pulse from square waves applied thereto coincident with the leading edge thereof, interconnecting said source and said input circuit, an output circuit including a pair of said plurality of output positions, and circuit means for connecting said source to said electromagnetic reset means to actuate said relay coincident with the trailing edge of each square wave pulse sequentially to connect said input circuit to each of said output positions for transmission to said output circuit of two of said control pulses spaced a time interval dependent upon the number of said output positions between said pair and the period of said square wave pulses.

5. In an interval measuring system in which a voltage having a condition control frequency is applied to the signal circuit of a counter which has a control circuit the combination therewith which comprises an electronic source of constant frequency sinusoidal waves, clipping and squaring means connected to said source for producing from said waves rectangular current pulses having an abrupt leading edge, means for generating a voltage pip coincident with and derived from said leading edge, a stepping switch connected at its input circuit to the output of said pip generating means, mechanical driving means for connecting the input circuit of said stepping switch sequentially to an initial output position and to each of a plurality of succeeding output positions, electromechanical means in circuit with said clipping and squaring means for resetting said driving means coincident with said leading edge and for moving said switch at the trailing edge of said pulses, a circuit interconnecting said initial output position and a selected one of said succeeding output positions and said control circuit for transmission thereto of two pips spaced a time interval dependent upon the number of output positions between said initial output position and said selected succeeding output position and the time interval between succeeding pips.

PHILLIP M. GREEN.

References Cited in the file of this patent
UNITED STATES PATENTS

| Number | Name | Date |
|---|---|---|
| 2,442,497 | Kelk et al. | June 1, 1948 |
| 2,481,607 | McGoffin | Sept. 13, 1949 |
| 2,556,172 | Dunlap et al. | June 12, 1951 |